United States Patent [19]

Steiger et al.

[11] Patent Number: 4,612,898
[45] Date of Patent: Sep. 23, 1986

[54] CYLINDER HEAD FOR A PISTON INTERNAL COMBUSTION ENGINE

[75] Inventors: Anton Steiger, Illnau; Robert Hofer, Elgg, both of Switzerland

[73] Assignee: Sulzer Brothers Limited, Winterthur, Switzerland

[21] Appl. No.: 707,570

[22] Filed: Mar. 4, 1985

[30] Foreign Application Priority Data

Jan. 11, 1985 [CH] Switzerland ............... 127/85

[51] Int. Cl.$^4$ .................. F02B 3/06; F02M 43/00
[52] U.S. Cl. .................... 123/299; 123/304; 123/305
[58] Field of Search .......... 123/299, 300, 301, 304, 123/305, 1 A, 25 C, 575

[56] References Cited

U.S. PATENT DOCUMENTS 1,498,273  6/1924  Hesselman .............. 123/299 X
1,767,701  6/1930  Riehm ..................... 123/304

FOREIGN PATENT DOCUMENTS 548312  11/1935  Fed. Rep. of Germany ...... 123/299

Primary Examiner—Tony M. Argenbright
Attorney, Agent, or Firm—Kenyon & Kenyon

[57] ABSTRACT

The cylinder head to the combustion chamber is provided with a peripheral array of injection nozzles for injection non-igniting fuel into the combustion chamber and a central fuel injection nozzle for injecting an ignition fuel. The openings of the respective nozzles are arranged to inject a distribution of the fuels in the combustion chamber which is symmetrical relative to the cylinder axis. The openings of the peripheral nozzles are disposed to inject fuel transversely into the combustion chamber symmetrically to a plane passing through each respective peripheral nozzle and the central nozzle while the central nozzle has a nozzle opening in each such plane.

8 Claims, 3 Drawing Figures

CYLINDER HEAD FOR A PISTON INTERNAL COMBUSTION ENGINE

This invention relates to a cylinder head for a piston internal combustion engine.

As is known, the combustion chambers for piston internal combustion engines have usually been constructed of a cylinder in which a piston may reciprocate and a cover which closes off one end of the cylinder so as to form a combustion chamber. In the case of two-cycle engines having reverse scavenging, it has been known to provide fuel injection nozzles exclusively in the center of the cylinder cover since this is the simpliest arrangement by which the combustion chamber can be supplied with fuel homogenously. However, if these engines use fuels which are not self-igniting, for example fuel gas or liquid fuels with a cetane number of less than zero, current practice is either to arrange an additional ignition oil nozzle eccentrically in the cover or to choose a construction in which two injection nozzles are nested concentrically. (M. Miyake et al. "The development of high output, highly efficient gas burning diesel engines", paper D 11.2, Cimac Congress Paris 1984).

However, in the first case, where an additional ignition oil injection nozzle is disposed eccentrically, a disadvantage exists in that the ignition which starts at the ignition oil injection nozzle cannot spread concentrically over the combustion chamber. This means that the main fuel which is farthest away from the ignition oil nozzle is ignited late.

In the second case, wherein use is made of nested concentric injection nozzles, although the above disadvantage is eliminated, the combination injection nozzles present great difficulties of a structural nature which, as a rule, impairs operational reliably of the nozzles.

Accordingly, it is an object of the invention to provide a nozzle arrangement for a cylinder head for a piston internal combustion engine which does not require nesting of two nozzles.

It is another object of the invention to provide a symmetrical distribution of two fuels within a combustion chamber of a piston internal combustion engine.

It is another object of the invention to provide a distribution of two fuels symmetrically and concentrically relative to a cylinder axis in a combustion chamber of an internal combustion engine.

Briefly, the invention provides a cylinder head for a piston internal combustion engine which has a central longitudinal axis, at least two fuel injection nozzles peripherally mounted in the head symmetrically of the longitudinal axis for injecting one fuel and a third fuel injection nozzle mounted in the head on the axis for injecting a second fuel. To advantage, ignition oil is burned in the central nozzle which is disposed on the longitudinal axis of the head while non-self-igniting main fuel is supplied to the peripherally mounted nozzles.

With the nozzle arrangement, a distribution of both fuels can be obtained with pronounced symmetry relative to the cylinder axis. Thus, complete concentricity exists between the ignition fuel jets and the distribution of the main fuel depending on the number of peripheral injection nozzles.

One advantage of the nozzle arrangement is that the number of ignition points is increased and this in proportion to the number of peripheral injection nozzles.

If ash-containing fuels are used, the openings of the peripherally mounted injection nozzles are arranged and formed symmetrically to the distance planes between the central injection nozzle and the peripheral nozzles so that the resulting jet distribution is twist-free relative to the cylinder axis. This prevents any ash particles from being hurled by centrifugal force against the wall of the cylinder and eliminates adhering of any ash particles to the cylinder wall.

In order to obtain an optimum fuel/air distribution, the diameters of the nozzle openings of the peripherally mounted injection nozzles are made of different sizes in dependence on the required throw range of a jet of fuel ejected therefrom. That is, the diameters of the nozzle openings increase with increasing throw range.

A uniformly distributed centrally symmetrical "area" ignition is obtained when the nozzle openings of the central injection nozzle extend in the clearance planes to the peripheral injection nozzles.

These and other objects and advantages of the invention will become more apparent from the following detailed description taken in conjunction with the accompanying drawings wherein.

Figure 1:
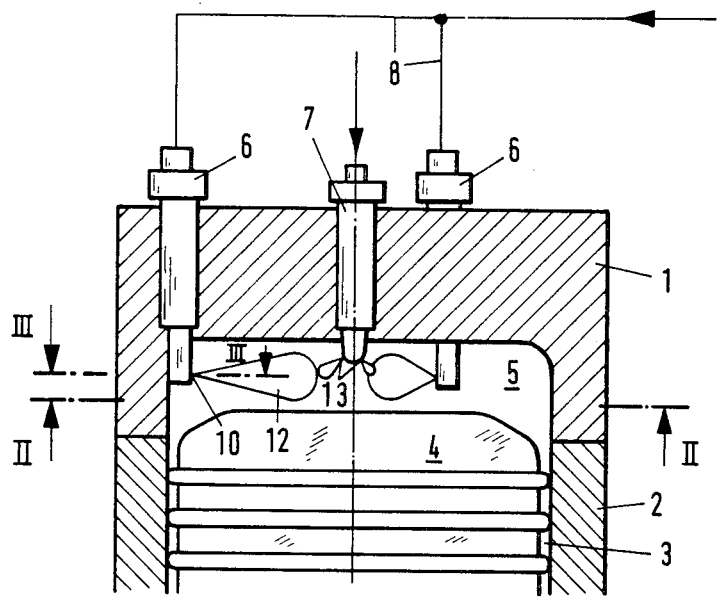
FIG. 1 illustrates a cross sectional view of a cylinder head mounted on a cylinder of a combustion chamber in accordance with the invention.

Referring to FIG. 1, a cylinder head 1 is mounted on and connected with a cylinder 2 of an internal combustion engine and in which a piston 4 reciprocates within a cylinder cavity 3. The head 1 serves to close off the cylinder cavity 3 so as to define a combustion chamber 5 at the upper end of the cylinder cavity 3, as viewed. During operation, the piston 4 moves towards and away from the combustion chamber 5 in known manner. As indicated in FIG. 1, the piston 4 is at the topmost position relative to the cover 1.

Figure 2:
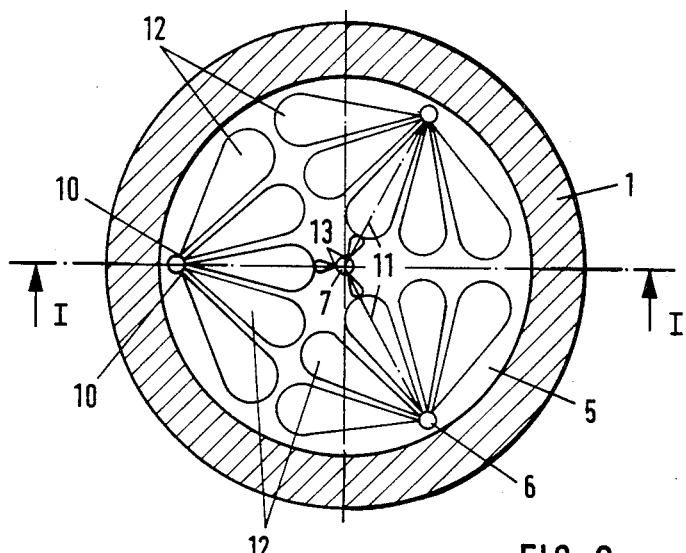
FIG. 2 illustrates a view taken on line II—II of FIG. 1 of the nozzle arrangement in the head in accordance with the invention.

The head 1 contains a nozzle arrangement for the injection of two fuels into the combustion chamber 5. To this end, a plurality of fuel injection nozzles 6 are mounted in the cover peripherally and symmetrically of a central longitudinal axis of the cover 1 and cylinder 2. As indicated in FIG. 2, the injection nozzles 6 are disposed 120° apart. As indicated in FIG. 1, each of the injection nozzles 6 is parallel to the central axis and passes into the combustion chamber 5.

In addition, a central fuel injection nozzle 7 is mounted in the head on the central axis and also protrudes into the combustion chamber 5 in parallel relation to the central axis.

Referring to FIG. 1, the peripherally mounted nozzles 6 are charged with a non-self-igniting-main fuel, which consists, for example, of coal particles suspended in a liquid, via feed lines 8. The central injection nozzle 7 is provided with an ignition fuel, generally normal diesel oil. To this end, a suitable injection system (not shown) is connected to the central nozzle 7.

Referring to FIG. 2, each of the peripherally mounted injection nozzles 6 has nozzle openings 10 which are distributed in such a way and formed in such a way, for example as to direction and size, that for each nozzle 6 there results a distribution of individual injected fuel jets 12 which is symmetrical to the associated clearance plane 11 between the nozzles 6 and the central nozzle 7. As indicated in FIGS. 2 and 3, the openings 10 for each peripherally mounted nozzle 6 is sized and directed to inject jets of fuel 12 transversely into the combustion chamber 5 symmetrically of a longitudinal plane 11 passing through the central nozzle 7 and the respective peripheral nozzles 6.

In like manner, the central nozzle 7 has openings 13 which are arranged so that "ignition jets" issuing from these openings lie in the clearance planes 11. That is, as indicated in FIGS. 1 and 2, each opening 13 of the central nozzle 7 injects a jet of fuel transversely into the combustion chamber 5 and each of these openings is disposed on a longitudinal plane 11 extending from the central nozzle 7 through a peripherally mounted nozzle 6.

With the peripheral nozzles distributed in rotation-symmetry about the central nozzle 7, a symmetrical distribution of the fuel jets 12 occurs. This in turn permits the flow of the fuel-air mixture in the combustion chamber 5 to occur in a twist-free manner relative to the cylinder axis.

Figure 3:
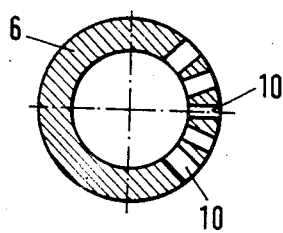
FIG. 3 illustrates a view taken on line III—III of a peripherally mounted injection nozzle in accordance with the invention.

Referring to FIG. 3, the openings 10 of each peripherally mounted nozzle 6 have different sizes in dependence on the throw of a jet of fuel to be injected therefrom. As viewed, the diameters of the nozzle openings 10 are greater as the "throw range" of the fuel jets are longer.

The invention thus provides a simple arrangement of nozzles within a cylinder head of a combustion chamber which is able to bring about a symmetrical distribution of ignition and non-self-igniting fuels.

What is claimed is:

1. In combination
   a cylinder head for a piston internal combustion engine having a central longitudinal axis;
   at least two fuel injection nozzles peripherally mounted in said head symmetrically of said longitudinal axis for injecting non-self-igniting main fuel; and
   a third fuel injection nozzle mounted on said head on said longitudinal axis for injecting an ignition fuel;
   each peripherally mounted nozzle having a plurality of nozzle openings arranged symmetrically of a clearance plane between said third nozzle and said respective peripherally mounted nozzle, said openings being formed to eject a jet of fuel having a twist-free distribution relative to said longitudinal axis.

2. The combination as set forth in claim 1 wherein said openings in each peripherally mounted nozzle differ in size in dependence on the required throw range of a jet of fuel ejected therefrom.

3. The combination as set forth in claim 2 wherein said third nozzle has a nozzle opening in each clearance plane extending to a respective peripherally mounted nozzle.

4. In combination,
   a cylinder having a longitudinal axis;
   a head mounted on said cylinder at one end thereof to define a combustion chamber for a piston mounted in said cylinder;
   a central fuel injection nozzle mounted in said head on said axis to deliver a ignition fuel into said combustion chamber; and
   at least two fuel injection nozzles peripherally mounted in said cover symmetrically of said axis for injecting non-self-igniting fuel into said combustion chamber, each peripherally mounted nozzle having a plurality of openings for injecting jets of fuel transversely into said combustion chamber symmetrically of a longitudinal plane passing through said central nozzle and said respective peripherally mounted nozzle.

5. The combination as set forth in claim 4 wherein said openings of each peripherally mounted nozzle have different sizes in dependence of the throw of a jet of fuel to be injected therefrom.

6. The combination as set forth in claim 4 wherein said central nozzle has a plurality of openings for injecting jets of fuel transversely into said combustion chamber, each said opening of said central nozzle being disposed in a respective longitudinal plane extending from said central nozzle through a peripherally mounted nozzle.

7. The combination as set forth in claim 4 wherein three peripherally mounted nozzles are disposed symmetrically about said central nozzle.

8. In combination
   a cylinder head for a piston internal combustion engine having a central longitudinal axis;
   at least two fuel injection nozzles mounted in said head peripherally and symmetrically of said axis for injecting one fuel; and
   a third fuel injection nozzle mounted in said head on said axis for injecting a second fuel;
   each peripherally mounted nozzle has a plurality of openings for injecting jets of fuel transversely into said combustion chamber symmetrically of a longitudinal plane passing through said central nozzle and said respective peripherally mounted nozzle.

* * * * *

UNITED STATES PATENT AND TRADEMARK OFFICE
CERTIFICATE OF CORRECTION

PATENT NO. : 4,612,898
DATED : September 23, 1986
INVENTOR(S) : Anton Steiger

It is certified that error appears in the above-identified patent and that said Letters Patent is hereby corrected as shown below:

Abstract, line 3 "injection" should read -injecting-

Column 1, line 24 "Congress Paris" should read -Congress, Paris-

Column 1, line 37 "reliably" should read -reliability-

Column 4, line 13 "a" should read -an-

Signed and Sealed this

Thirty-first Day of March, 1987

Attest:

DONALD J. QUIGG

Attesting Officer

Commissioner of Patents and Trademarks